(12) United States Patent
Koo et al.

(10) Patent No.: US 6,625,012 B1
(45) Date of Patent: Sep. 23, 2003

(54) DEGAUSSING COIL FIXING HOLDER FOR A MONITOR

(75) Inventors: Young-Hoi Koo, Suwon (KR); Young-Tai Kim, Yongin (KR); Ju-Hwan Kim, Seoul (KR); Kyung-Kyun Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 52 days.

(21) Appl. No.: 09/592,544

(22) Filed: Jun. 12, 2000

(30) Foreign Application Priority Data

Oct. 19, 1999 (KR) ......................................... 1999-45397
Oct. 19, 1999 (KR) ......................................... 1999-45398

(51) Int. Cl.[7] ................................................. G06F 1/16
(52) U.S. Cl. ............................. 361/682; 361/150; 315/8
(58) Field of Search ................................ 348/787, 789, 348/805, 822–825, 836; 313/313, 402, 429, 430, 437, 479, 477 R; 361/150, 152, 149, 153, 682; 315/8, 85

(56) References Cited

U.S. PATENT DOCUMENTS 5,742,128 A  *  4/1998  Bearce et al. ................... 315/8
6,204,894 B1 *  3/2001  Manson ....................... 348/821

* cited by examiner

Primary Examiner—Darren Schuberg
Assistant Examiner—Yean-Hsi Chang
(74) Attorney, Agent, or Firm—Robert E. Bushnell, Esq.

(57) ABSTRACT

A degaussing coil fixing holder. One degaussing coil fixing holder formed horizontally which comprises a horizontal bar including a guide groove and receiving a degaussing coil, at least one protruding part protruded backwards from the horizontal bar and including a through-hole, a snap member formed at an inner side of the guide groove and preventing the degaussing coil from separating from the guide groove, and a supporting member formed integrally at the protruding part and supporting elastically the horizontal bar and the protruding parts, fixes the degaussing coil by locking a screw penetrating the through-hole in holes formed at the upper and lower part of a shielding. Another degaussing coil fixing holder detachably connected to a front case of the monitor, and being secured to the front case by a corresponding snap hook extending horizontally backwards from a rear side of the front case, the degaussing coil fixing holders comprising a guide part for receiving a second degaussing coil, the degaussing coils being connected to each other by a wire; and a supporting part having a support surface for supporting the cathode-ray tube.

20 Claims, 9 Drawing Sheets

DEGAUSSING COIL FIXING HOLDER FOR A MONITOR

This application makes reference to, incorporates the same herein, and claims all benefits accruing under 35 U.S.C §119 from two applications entitled *Apparatus For Supporting A C.R.T. Of Monitor* earlier filed in the Korean Industrial Property Office on Oct. 19, 1999, and there duly assigned Serial No's. (1) 99-45397 by that Office, and entitled *Holder For Degaussing Coil Of Monitor* earlier filed in the Korean Industrial Property Office on Oct. 19, 1999, and there duly assigned Serial No's.(2) 99-45398 by that Office.

BACKGROUND OF THE INVENTION

1. Field of the Invention

The present invention relates to a holder for fixing a degaussing coil of a monitor, and more particularly, to a holder enabling to prevent the noise of a degaussing coil by fixing the degaussing coil.

2. Description of the Background Art

Generally, a monitor is an apparatus displaying letters, signs and figures by using lights of which each different brightness and color are produced by outputting an electron beam from an electron gun of a cathode-ray tube by a video signal and hitting a fluorescence material on a cathode-ray tube.

When the cathode-ray tube of a monitor is operated, an electromagnetic field is formed around the cathode-ray tube and a degaussing coil and purity coil are provided for dissolving the electromagnetic field. When power is supplied to the monitor, the cathode-ray tube and the degaussing coil interact electromagnetically and draw each other by the magnetism causing the degaussing coil to touch the outside of the cathode-ray tub, when a user turns on a power switch for turning on the monitor. At this time, there is a problem of noise at predetermined level being caused the by the degaussing coil touching the outside of the cathode-ray tube.

The cathode-ray tube is heavy and may droop downward. When the cathode-ray tube is connected to the front case, the front case can be distorted because of the weight of the cathode-ray tube, thus there is a problem which may cause a wrong operation of a switch box by an outside pressing power.

Also, the cathode-ray tube is connected to the front case only by a screw and connecting members, and there is a problem that a set is in motion during the assembling process since an assembled status of the cathode-ray tube and the front case is not solid.

SUMMARY OF THE INVENTION

Therefore, it is an object of the present invention to provide a degaussing coil fixing holder which prevents the malfunction of a switch box and the deformation of a front case by supporting the cathode-ray tube and prevents the noise caused from the degaussing coil at the time of supplying the power.

In order to achieve the above object, a preferred embodiment provides a holder comprising a horizontal bar having a guide groove formed at the upper part thereof on which a degaussing coil is placed, at least one protruding part formed backwards and including a through-hole, a snap member formed at the inner side of the guide groove and preventing the degaussing coil from separating from the guide groove, and a supporting member formed integrally at the protruding parts and supporting elastically the horizontal bar and the protruding parts, which fixes the degaussing coil of a monitor by locking screws penetrating the through-hole in holes formed at the upper and lower parts of the shielding.

According to a preferred embodiment of the present invention, a reinforcing member flexed in the predetermined form is added to the inner side of the guide groove of the horizontal bar so that the degaussing coil is fixed to the inner side of the guide groove.

The both ends of the guide groove are flexed backwards at a predetermined angle and corners of the degaussing coil can be easily placed at the ends of the guide groove.

Also, the supporting member formed integrally at the lower side of at least one of protruding parts is protruded downwards at a predetermined angle and is contacted elastically to the bottom of the shielding.

Another embodiment of the present invention provides a monitor comprising a front case including a snap member protruded backwards and placed at a predetermined portion of the back and lower part thereof, a cathode-ray tube secured at a predetermined portion of the back side of the front case, a degaussing coil secured at the cathode-ray tube and dissolving an electromagnetic field formed around the cathode-ray tube, and a degaussing coil fixing holder connected detachably to the front case by connecting to the snap member of the front case, which supports the cathode-ray tube and simultaneously receives the degaussing coil.

In another embodiment of the present invention, a holder fixing a degaussing coil comprises a supporting part supporting a cathode-ray tube, a bottom formed integrally at a lower portion of the supporting part and supporting a supporting member of the cathode-ray tube, and a guide part protruded from one side of the supporting part and guiding the degaussing coil.

The guide part in the L-shape includes a guiding groove and guides the degaussing coil.

The holder fixing the degaussing coil is connected integrally to the front case by a through-hole formed in the holder fixing the degaussing coil and the snap member penetrating the through-hole.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PRESENT INVENTION

Figure 1:
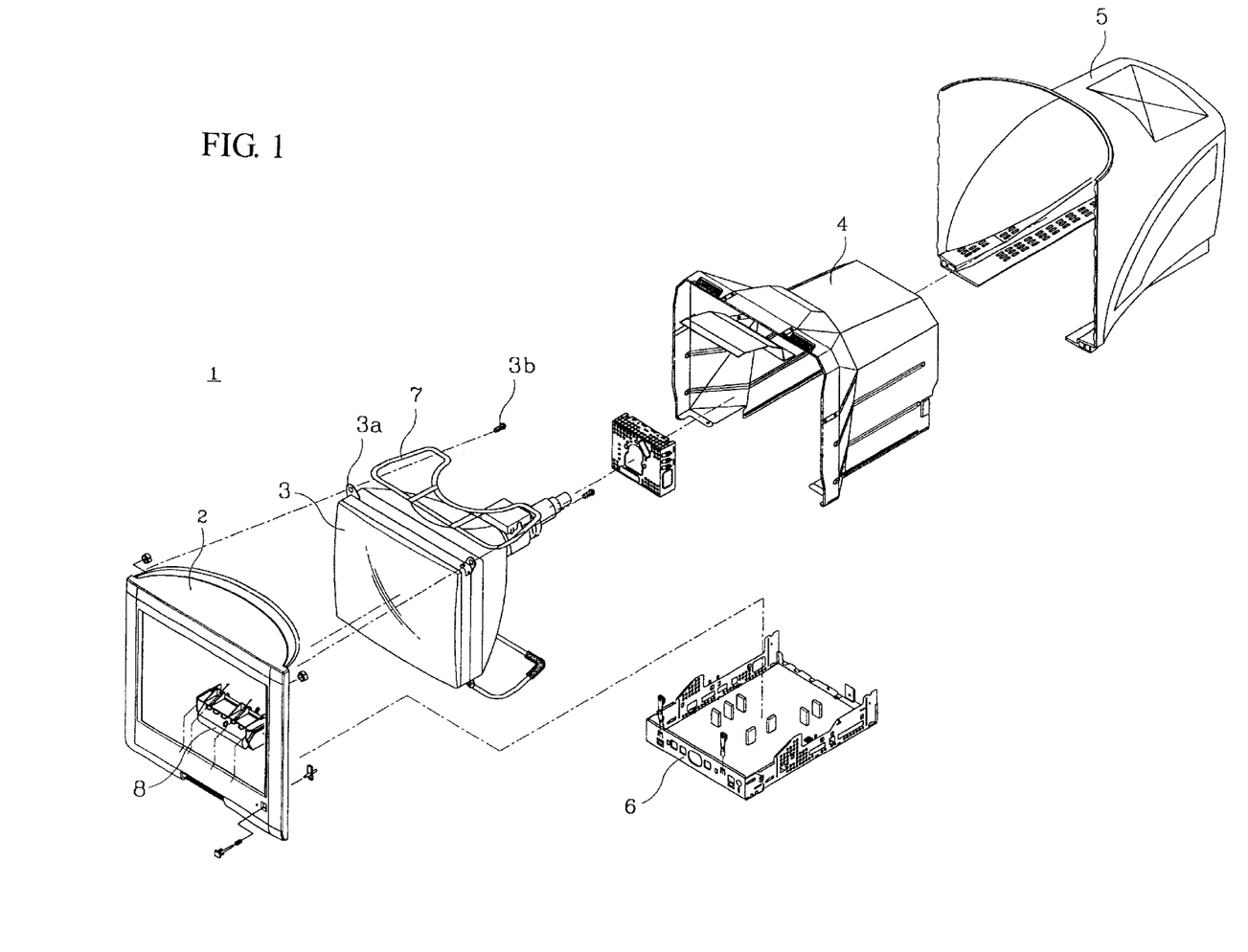
FIG. 1 is an exploded perspective view illustrating the inner structure of an exemplary monitor.
Figure 2:
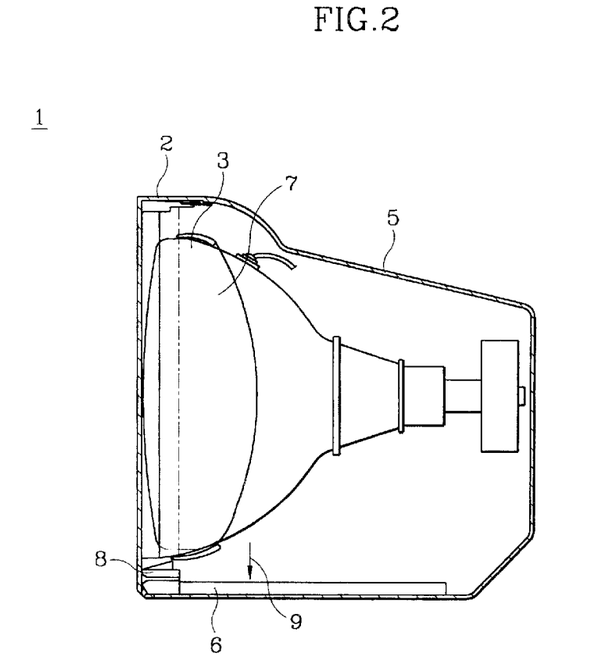
FIG. 2 is a side view illustrating a cathode-ray tube drooping downward in the monitor of FIG. 1.

FIG. 1 is an exploded perspective view illustrating an inner structure of an exemplary monitor having a degaussing coil and FIG. 2 is a cross-sectional view illustrating the monitor of FIG. 1 including a functional switch pressed by the weight of the cathode-ray tube.

As shown in FIGS. 1 and 2, a monitor 1 comprises a front case 2, a cathode-ray tube 3 placed in the front case 2, a printed circuit board (PCB) 6 electronically controlling the monitor 1, a shielding 4 covering the cathode-ray tube 3 and cutting off an electromagnetic wave generated from the cathode-ray tube 3 and a rear cover 5 connected at the back side of the front case 2.

A degaussing coil 7 is placed on the outside of the cathode-ray tube 3 for dissolving an electromagnetic field. If the power is supplied to the monitor 1, the cathode-ray tube 3 is operated and an electromagnetic field is formed around the cathode-ray tube 3. Therefore, the degaussing coil 7 is needed for dissolving the electromagnetic field.

The cathode-ray tube 3 is connected to the back side of the front case 2 by screws 3b inserted threw connecting tabs 3a protruded from each of the four corners of the cathode-ray tube 3. That is, the cathode-ray tube 3 is connected to the front case 2 by locking the screw 3b penetrating each connecting tab 3a in a connecting groove (not shown) formed at four corners of the front case 2.

When power is supplied to the monitor, the cathode-ray tube and the degaussing coil interact electromagnetically and draw each other by the magnetism causing the degaussing coil to touch the outside of the cathode-ray tube by the magnetism when a user turns on a power switch for turning on the monitor. At this time, there is a problem of noise predetermined level being caused by the degaussing coil touching the outside of the cathode-ray tube.

The cathode-ray tube is heavy and droops downward in the direction of the arrow 9 in FIG. 2. When the cathode-ray tube is connected to the front case, the front case can be distorted because of the weight of the cathode-ray tube, thus there is a problem which may cause a wrong operation of a switch box 8 by an external force.

Figure 3:
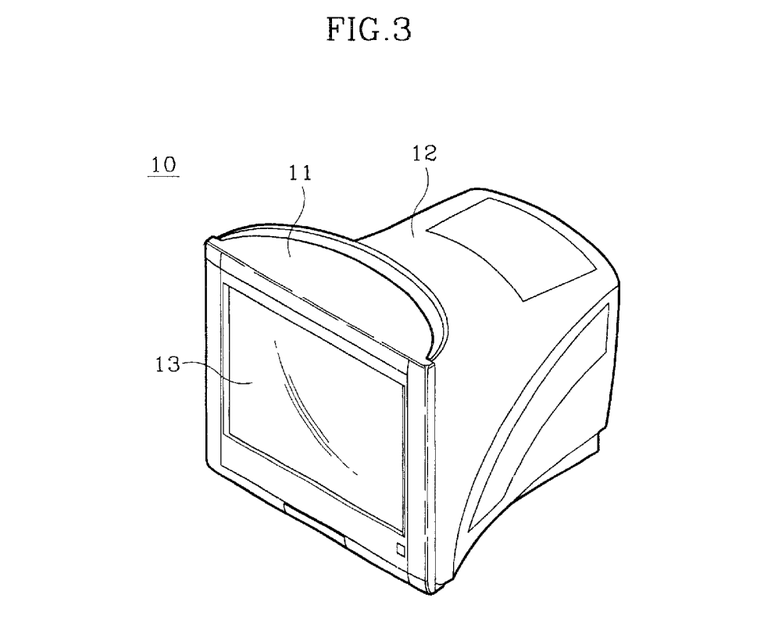
FIG. 3 is a perspective view illustrating a monitor according to a preferred embodiment of the present invention.
Figure 4:
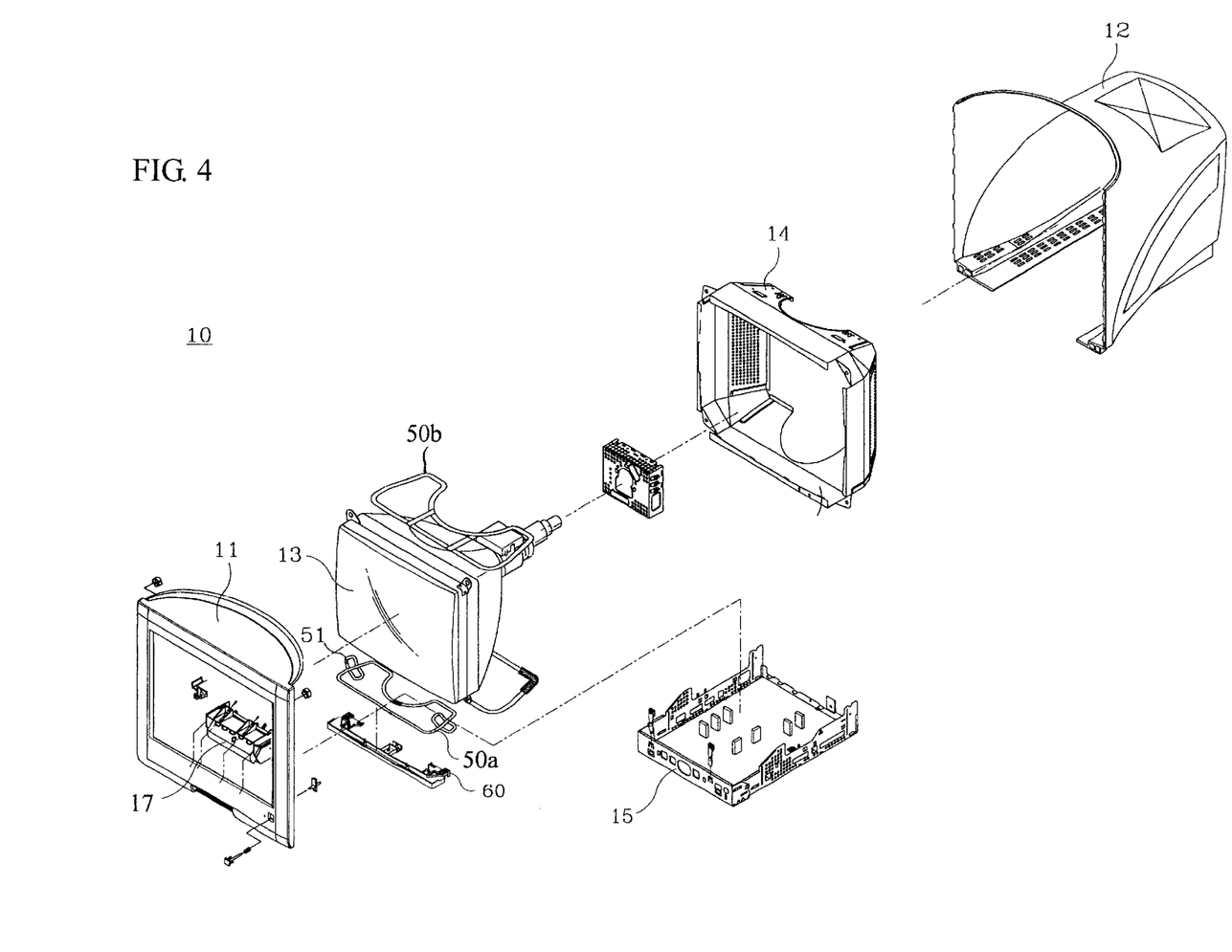
FIG. 4 is an exploded perspective view illustrating the inner structure of a monitor comprising a holder fixing a degaussing coil according to a preferred embodiment of the present invention.

FIG. 3 is a perspective view illustrating a monitor according to a preferred embodiment of the present invention, and FIG. 4 is an exploded perspective view illustrating the inner structure of a monitor including a degaussing coil fixing holder according to a preferred embodiment of the present invention.

As shown in FIGS. 3 and 4, a monitor 10 comprises a front case 11, a cathode-ray tube 13 placed in the front case 11 and displaying letters or signs, a PCB 15 controlling electronically the monitor 10, a shielding 14 intercepting electromagnetic waves from the cathode-ray tube 13 by covering the cathode-ray tube 13, a switch box 17 and a rear cover 12 connected integrally to the back side of the front case 11.

An electromagnetic field formed around the cathode-ray tube 13 is dissolved by a degaussing coil 50a and a purity coil 51 placed at the lower part of the cathode-ray tube 13 and a degaussing coil 50b placed at the upper part of the cathode-ray tube 13. The degaussing coil 50a and the purity coil 51 are fixed to a holder 60. In reference with FIGS. 5 and 6, it will be described in details how to fix the degaussing coil 50a to the holder 60.

Figure 5:
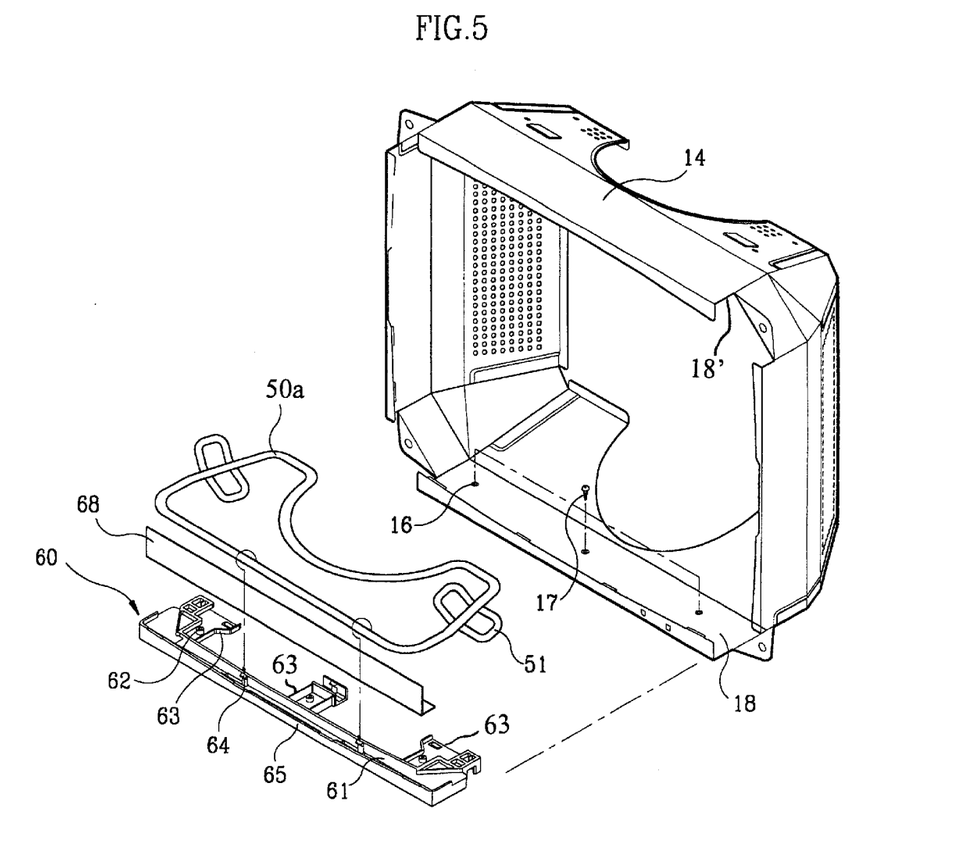
FIG. 5 is an enlarged perspective view illustrating in details the holder fixing the degaussing coil secured in an electromagnetic wave shielding.
Figure 6:
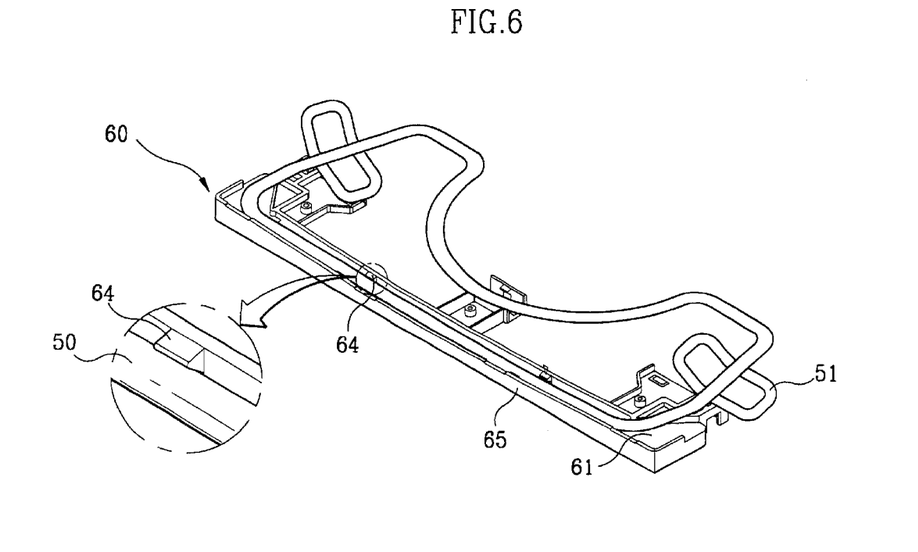
FIG. 6 is an enlarged perspective view illustrating the degaussing coil placed in the holder fixing the degaussing coil illustrated in FIG. 5.

FIG. 5 is an enlarged perspective view illustrating in details the holder 60 shown in FIG. 4 for fixing the degaussing coil secured in an electromagnetic wave shielding. FIG. 6 is an enlarged perspective view illustrating the degaussing coil placed in the holder illustrated in FIG. 5.

As shown in FIGS. 5 and 6, the holder 60 formed horizontally comprises a horizontal bar 65 including a guide groove 61 formed on the upside thereof, snap members 64 protruded upwards from the inner side of the guide groove 61 and fixing the degaussing coil 50a elastically, and plural protruding parts 63 protruded backwards from the horizontal bar 65. The holder 60 for fixing the degaussing coil will be made with a material of synthetic resin component.

The degaussing coil 50a is fixed inside of the guide groove 61 by snap members 64. Therefore, the width and depth of the guide groove 61 are sized appropriately for fixing the degaussing coil 50a. The both ends of the guide groove 61 are angled backwards at a predetermined angle to accommodate the corners of the degaussing coil 50a.

Snap members 64 protrude from one side of the guide groove 61 for preventing the degaussing coil 50a a from separating from the guide groove 61. When the degaussing coil 50a is fixed to the inside of the guide groove 61, the snap member 64 presses elastically against one side of the degaussing coil 50a and includes a hook for extending over a portion of the degaussing coil 50a a so that the snap member 64 prevents the degaussing coil 50a from the separating from the guide groove 61.

Also, a reinforcing member 68 is provided in order to firmly fix the degaussing coil 50a to the inside of the guide groove 61. The reinforcing member 68 is formed preferably in the L-shape and placed in the guide groove 61 before degaussing coil 50a is inserted in groove 61. Accordingly, the gap between the degaussing coil 50a and the guide groove 61 is filled with the reinforcing member 68 so that the degaussing coil 50a is firmly fixed.

Plural protruding parts 63, preferably, three protruding parts 63, are protruded backwards from the horizontal bar 65. A through-hole 62 is formed in each of plural protruding parts 63. The plurality of screws 17 penetrate the through-holes 62 and fasten the holder 60 to a mounting hole 16 formed at a lower ledge 18 extending from shielding 14, and the holder 60 is fixed to lower ledge 18 of shielding 14.

Figure 7:
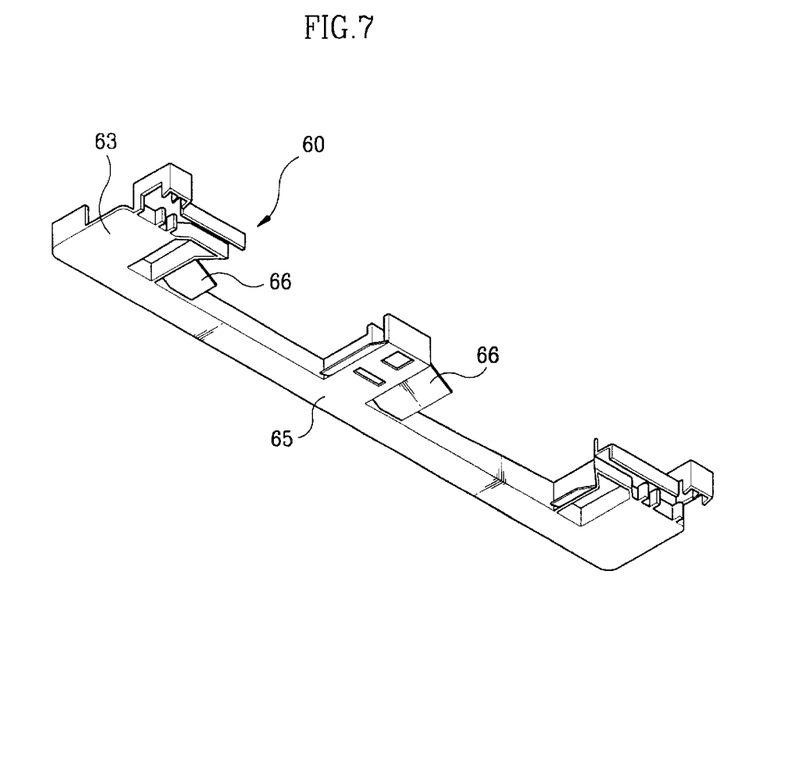
FIG. 7 is a perspective view illustrating a bottom side of the holder fixing the degaussing coil illustrated in FIG. 5.
Figure 8:
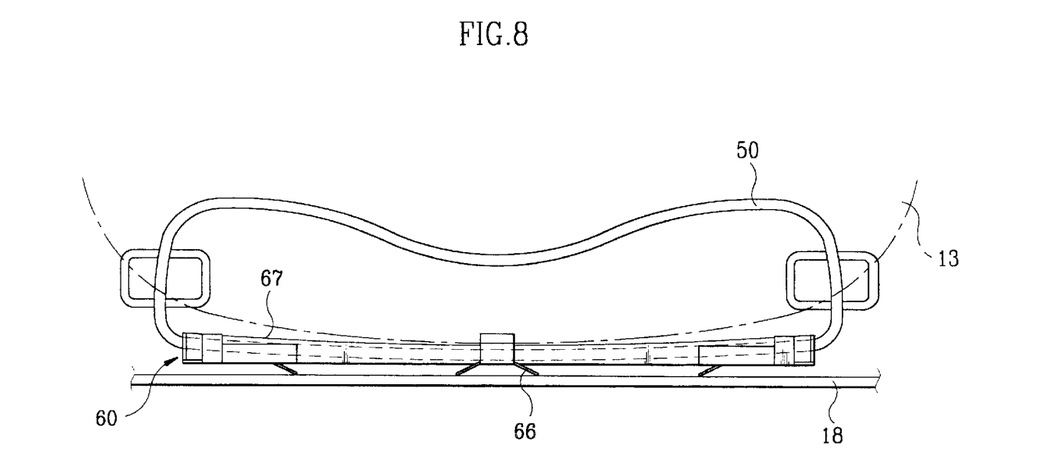
FIG. 8 is a view illustrating the holder fixing the degaussing coil secured to a monitor according to the present invention.

Meanwhile, as shown in FIGS. 7 and 8, the holder 60 comprises plural supporting members 66 in a shape of thin plate which has a predetermined elasticity and is formed at the bottom of holder 60. The supporting members 66 are formed to extend from the lower inner edge of the outside protruding parts 63 and from the lower edge on both sides of the central protruding part 63. Each a supporting member 66 slopes downward at a predetermined angle. When the holder 60 is fixed to the shielding 14, the supporting member 66 touches with the lower ledge 18 of the shielding 14. Accordingly, the holder 60 can be fixed elastically to the lower ledge 18 of the shielding 14 by the supporting member 66.

Additionally, a second holder (not shown) identical to holder 60, fixes the degaussing coil 50b to the upper ledge 18' of shielding 14.

As shown in FIGS. 5 to 8, the holder 60 is fixed to the shielding 14 on lower ledge 18. The holder 60 is placed horizontally in the lower ledge 18 of the shielding 14 with the through-hole 62 corresponding to the mounting hole 16. And the screw 17 penetrates the through-hole 62 and is locked in the mounting hole 16 so that the holder 60 is fixed to the shielding 14. At this time, the supporting member 66 formed at the bottom side of the holder 60 elastically contacts the lower ledge 18 of the shielding 14.

After fixing the holder 60, the reinforcing member 68 is placed in the guide groove 61 of the holder 60. The degaussing coil 50a is then inserted into the guide groove 61. At this time, a portion of the degaussing coil 50a contacts with the snap member 64 and a user presses the degaussing coil 50a downwards so that the degaussing coil 50a is fixed within guide groove 61. Accordingly, the snap member 64 prevents the degaussing coil 50a from separating from the guide groove 61.

The degaussing coil 50b is fixed to the upper part of the cathode-ray tube 13 according to the same process as stated above for degaussing coil 50a. The upper and lower parts of the degaussing coil 50a and 50b are connected to each other by a connecting member such as wire (not shown).

Therefore, when the electromagnetic field is generated by operating of the cathode-ray tube 13, the degaussing coils 50a and 50b and the purity coil 51, fixed by the holders 60, do not come into 16 contact with outside of the cathode-ray tube 13.

The holder has the advantage of preventing any noise caused by the degaussing coil and the purity coil contacting the outside of the cathode-ray tube since the degaussing coil and the purity coil are fixed by the holder.

Hereinafter, a holder according to another preferred embodiment of the present invention will be described in details in reference with the attached drawings.

Figure 9:
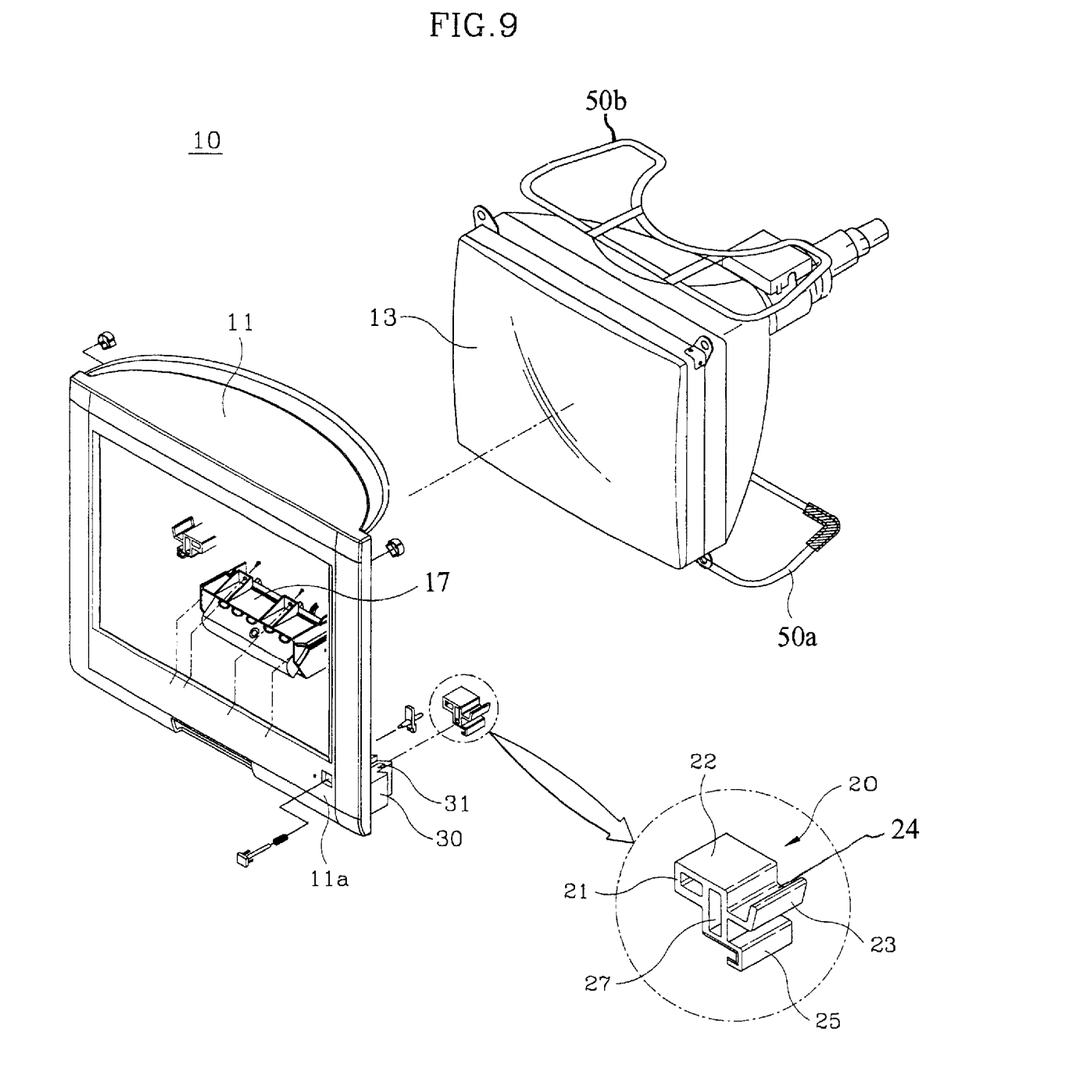
FIG. 9 is an exploded perspective view illustrating the holder fixing the degaussing coil connected integrally to the back side of the front case according to a preferred embodiment of the present invention.
Figure 10:
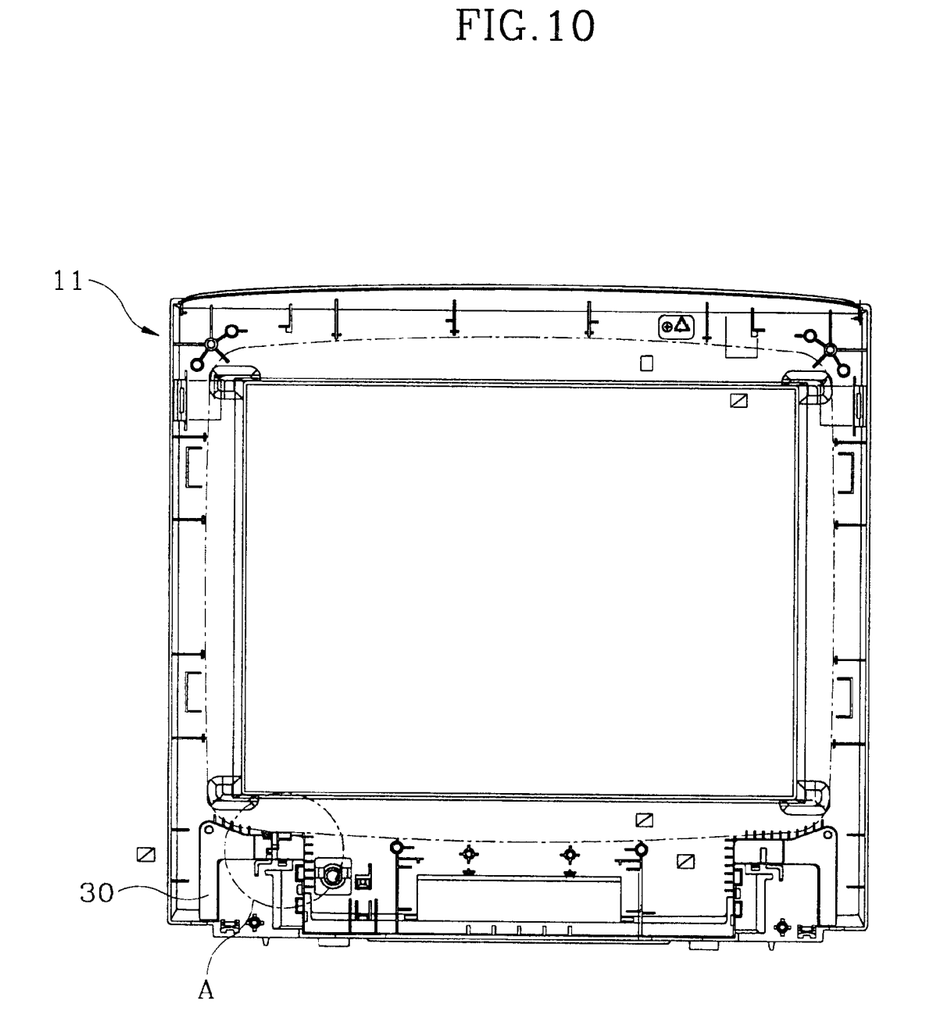
FIG. 10 is a view showing a state wherein the holder fixing the degaussing coil is secured to the back side of the front case.
Figure 11:
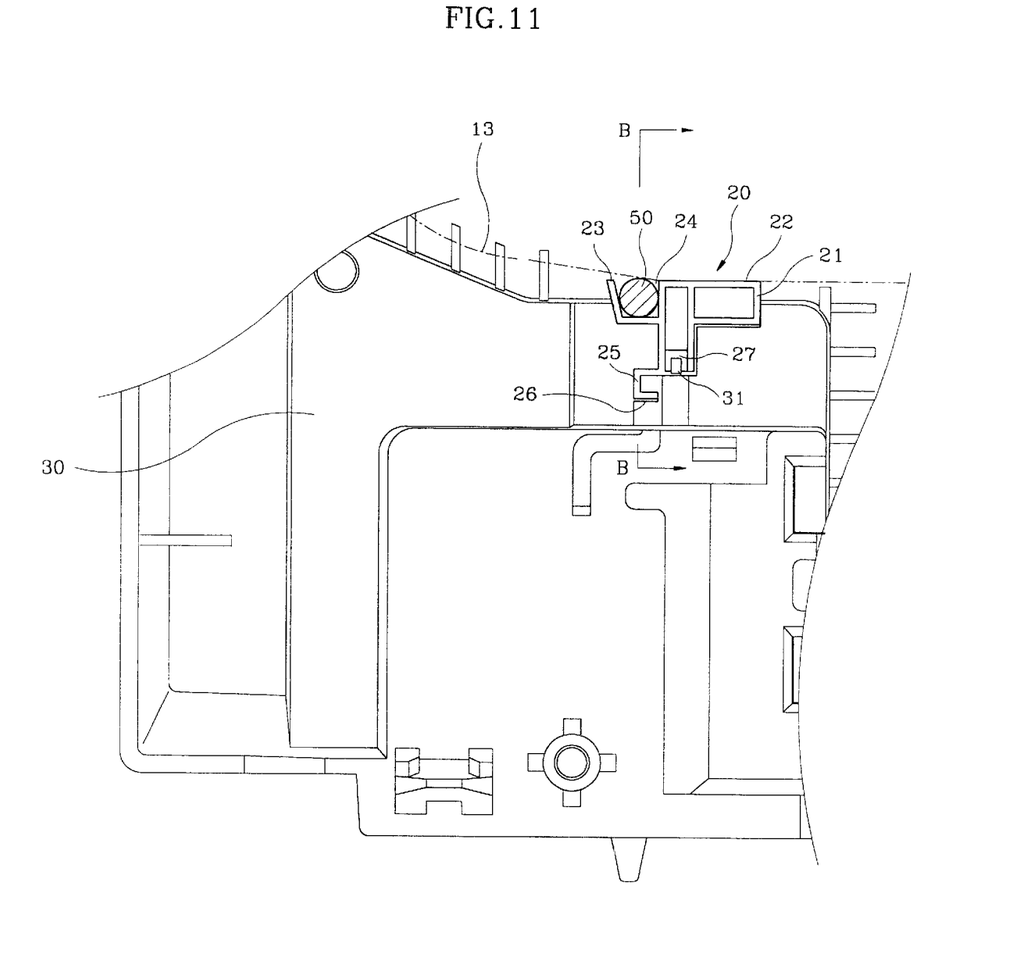
FIG. 11 is an enlarged view illustrating the part "A" indicated in FIG. 10.
Figure 12:
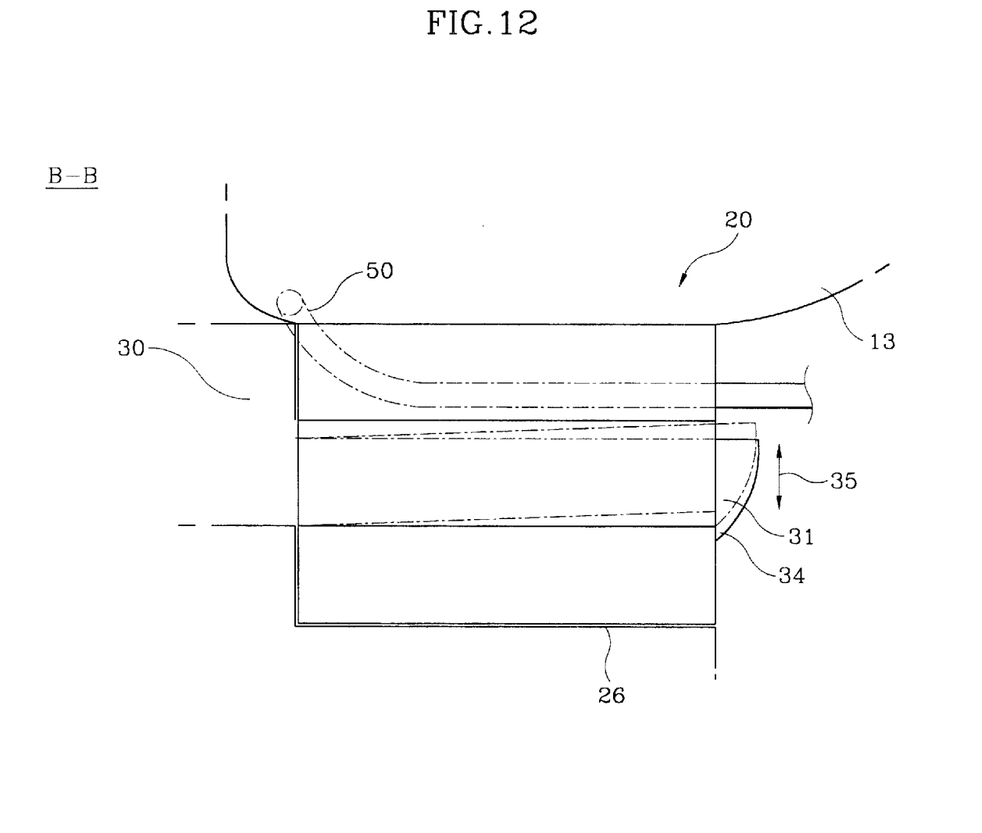
FIG. 12 is a cross-sectional view illustrating the cross section "B—B" indicated in FIG. 11.

FIG. 9 is an exploded perspective view illustrating how to connecting a holder to the back side of a front case. FIG. 10 is a view showing a status of a holder connected to the backside of the front case. And FIGS. 11 and 12 are enlarged views of the part "A" indicated in FIG. 10.

A front case, a PCB, a cathode-ray tube and a rear cover are the same elements as in a monitor according to the above embodiment of the present invention and will not be described in further detail.

As shown in FIG. 9, a degaussing coil, 50a and 50b, is placed at the upper and lower part of a cathode-ray tube 13 and the electromagnetic field generated around the cathode-ray tube 13 is dissolved.

Holders 20 for fixing the degaussing coil 50a are placed at the lower corners on the backside of the front case 11 in order to guide degaussing coil 50a and simultaneously support the cathode-ray tube 13. Each holder is made the same and the holder 20 shown in the enlarged view of FIG. 9 will now be described.

Holder 20 for fixing the degaussing coil comprises a guide part 23 receiving and guiding the degaussing coil 50a, a supporting part 21 for supporting the cathode-ray tube 13, and propping part 25 which is formed integrally under the supporting part 21 and props the holder 20.

The guide part 23 protruded from one side of the supporting part 21 has a L-shape and has a guiding groove 24. The degaussing coil 50a is placed in the guiding groove 24. Thus, the flexible degaussing coil 50a guided by the guiding groove 24 maintains a predetermined form.

The supporting part 21 having a flat upside 22 supports the underside of the cathode-ray tube 13. A connecting hole 27 is formed at a lower portion of the supporting part 21. A snap member 31 formed at a protruded part 30 of the front case 11 penetrates the connecting channel 27 so that the holder 20 is solidly connected to the front case 11. The propping part 25 maintains an appropriate intensity by having preferably a cross section in a rotated ⌐-shape. The propping part 25 is connected to a bracket 26 (see FIG. 11) formed at the backside of the front case 11. Accordingly, the holder 20 connected to the corner of the front case 11 guides the degaussing coil 50a and simultaneously supports the cathode-ray tube 13. Also, the holder 20 prevents the cathode-ray tube 13 from drooping downwards to keep the cathode-ray tube from touching a switch box 17 placed under the front case 11.

As shown in FIGS. 9 to 12, when the holder 20 is connected to the front case 11, the holder 20 is placed at an appropriate place for connecting to the front case 11. At this time, the connecting channel 27 is corresponding to the snap member 31 of the front case 11. To engage, holder 20 is pushed toward the front case 11 and at this time, the snap member 31 of the front case 11 moves in the upwards direction (FIG. 12) of arrow 35 as it passes through connecting channel 27. When holder 20 is contacts the front case 11, snap member 31 moves in the downward direction of arrow 35, and an end portion 34 of the snap member 31 is caught on a corner of the connecting channel 27. Accordingly, holder 20 for fixing the degaussing coil is connected solidly to the front case 11.

When holder 20 is connected solidly to the front case 11, the upside 22 of the supporting part 21 supports the underside of the cathode-ray tube 13. Accordingly, it is possible to prevent the cathode-ray tube 13 from drooping downwards. Simultaneously, the degaussing coil 50a is received and guided into the guiding groove 24 of guide part 23.

The holder according to the preferred embodiment of the present invention has the advantage of setting the degaussing coil in a definite form by guiding and receiving the degaussing coil. The holder described in the first embodiment can be used to hold the upper degaussing coil while the holder of the second embodiment can be used to hold the lower degaussing coil, both degaussing coils being connected by a wire.

Also, the holder has the advantage of preventing a malfunction of the switch box by preventing the front case from trembling or deforming because of the weight of the cathode-ray tube.

Although the preferred embodiment of the present invention has been described, it will be understood by those skilled in the art that the present invention should not be limited to the described preferred embodiment, but various changes and modifications can be made within the spirit and scope of the invention as defined by the appended claims.

What is claimed is:

1. A degaussing coil fixing holder mounted on a shielding of a monitor, said degaussing coil fixing holder comprising:

a horizontal bar including a guide groove for receiving a degaussing coil;

at least one protruding part protruded backwards from the horizontal bar and including a through-hole for receiving a screw which is secured to a ledge formed in said shielding;

a snap member formed at an inner side of the guide groove for holding the degaussing coil in said guide groove and preventing the degaussing coil from separating from the guide groove; and a supporting member formed integrally at the protruding part for elastically supporting said horizontal bar and the protruding parts on said ledge.

2. A degaussing coil fixing holder as claimed in claim 1, wherein a reinforcing member flexed in a predetermined form is added to an inner side of the guide groove of the horizontal bar so that the degaussing coil is fixed to the inner side of the guide groove.

3. A degaussing coil fixing holder as claimed in claim 2, wherein both ends of the guide groove are angled backwards at a predetermined angle to enable corners of the degaussing coil to be easily placed at the ends of the guide groove.

4. A degaussing coil fixing holder as claimed in claim 1, wherein the supporting member is formed integrally at a lower side edge of said at least one protruding part and protrudes downwards at a predetermined angle to elastically contact said ledge of the shielding.

5. A degaussing coil fixing holder as claimed in claim 1, wherein said ledge is formed in an upper portion of said shielding.

6. A degaussing coil fixing holder as claimed in claim 5, further comprising:

second and third degaussing coil fixing holders detachably connected to a front case of said monitor, each of said second and third degaussing coil fixing holders being secured to said front case by a corresponding snap hook extending horizontally backwards from respective corners of a rear side of said front case, each of said second and third degaussing coil fixing holders comprising:

a guide part for receiving a second degaussing coil, said degaussing coils being connected to each other by a wire; and a supporting part having a support surface for supporting the cathode-ray tube.

7. A degaussing coil fixing holder as claimed in claim 6, wherein the guide part guides the degaussing coils by having a cross-section in a L-shape to form a guiding groove.

8. A degaussing coil fixing holder as claimed in claim 6, each of said second and third degaussing coil fixing holders further comprising a propping part formed integrally at a lower portion of the supporting part for supporting the supporting member.

9. A degaussing coil fixing holder as claimed in claim 6, each of said second and third degaussing coil fixing holders further comprising a connecting channel through which said corresponding snap hook protrudes to enable said second and third degaussing coil fixing holders to be securely connected to said front case.

10. A degaussing coil fixing holder as claimed in claim 1, wherein said ledge is formed in a lower portion of said shielding.

11. A degaussing coil fixing holder as claimed in claim 1, wherein said shielding comprises an upper ledge and a lower ledge and said degaussing coil is comprised of a first and a second degaussing coil connected together by a wire, wherein each of said first and second degaussing coils is held by a corresponding said degaussing coil fixing holder.

12. A monitor characterized by comprising:

a front case including a snap member protruded backwards at a predetermined portion of a lower back side of said front case;

a cathode-ray tube connected integrally to a back side of the front case;

a degaussing coil for dissolving an electromagnetic field formed around the cathode-ray tube; and a first degaussing coil fixing holder detachably connected to the front case, said first degaussing coil fixing holder being secured to said front case by said snap member, wherein said first degaussing coil fixing holder supports the degaussing coil and simultaneously supports the cathode-ray tube.

13. A monitor as claimed in claim 12, wherein the first degaussing coil fixing holder comprises:

a supporting member having a support surface for supporting the cathode-ray tube;

a propping part formed integrally at a lower portion of the supporting member for supporting the supporting member; and a guide part protruded from one side of the supporting member for guiding the degaussing coil.

14. A monitor as claimed in claim 13, wherein the first degaussing coil fixing holder further comprises a connecting channel through which said snap member protrudes to enable said first degaussing coil fixing holders to be securely connected to said front case.

15. A monitor as claimed in claim 13, wherein the guide part guides the degaussing coil by having a cross-section in an L-shape and forming a guiding groove.

16. A monitor as claimed in claim 12, wherein said degaussing coil comprises first and second degaussing coils connected together by a wire, said monitor further comprising:

a second degaussing coil fixing holder similar to said first said degaussing coil fixing holder, said first degaussing coil and said cathode-ray tube being supported by both of said first and second degaussing coil fixing holders;

a shielding covering the cathode-ray tube and cutting off an electromagnetic wave generated from the cathode-ray tube; and a third degaussing coil fixing holder secured to a ledge formed in an upper portion of said shielding.

17. A monitor as claimed in claim 16, wherein said third degaussing coil comprises:

a horizontal bar including a guide groove for receiving the second degaussing coil;

at least one protruding part protruded backwards from the horizontal bar and including a through-hole for receiving a screw which is secured to said ledge formed in said shielding;

a snap hook formed at an inner side of the guide groove for holding the second degaussing coil in said guide groove and preventing the second degaussing coil from separating from the guide groove; and an flexible support member formed integrally at the protruding part for flexibly supporting said horizontal bar and the protruding parts on said ledge.

18. A monitor as claimed in claim 17, wherein a reinforcing member flexed in a predetermined form is added to the inner side of the guide groove of the horizontal bar so that the second degaussing coil is fixed to the inner side of the guide groove.

19. A monitor as claimed in claim 17, wherein the both ends of the guide groove are angled backwards at a predetermined angle to enable corners of the second degaussing coil to be easily placed at the ends of the guide groove.

20. A monitor as claimed in claim 17, wherein the flexible support member is formed integrally at a lower side edge of said at least one protruding part and protrudes downwards at a predetermined angle to elastically contact said ledge of the shielding.

* * * * *